(12) United States Patent
Brunet et al.

(10) Patent No.: US 7,635,937 B2
(45) Date of Patent: Dec. 22, 2009

(54) DEVICE FOR MAGNETICALLY SUSPENDING A ROTOR

(75) Inventors: Maurice Brunet, Sainte Colombe Pres Vernon (FR); Luc Baudelocque, Vernon (FR); Armand Lapierre, Fontaine Sous Jouy (FR)

(73) Assignee: Societe de Mecanique Magnetique, Saint Marcel (FR)

( * ) Notice: Subject to any disclaimer, the term of this patent is extended or adjusted under 35 U.S.C. 154(b) by 469 days.

(21) Appl. No.: 11/652,190

(22) Filed: Jan. 11, 2007

(65) Prior Publication Data
US 2007/0164627 A1    Jul. 19, 2007

(30) Foreign Application Priority Data
Jan. 13, 2006    (FR) .................................. 06 50121

(51) Int. Cl.
*H02K 7/09*    (2006.01)
*F16C 39/06*    (2006.01)
(52) U.S. Cl. ...................................... 310/90.5; 361/144
(58) Field of Classification Search .............. 310/90.5; 361/144, 159
See application file for complete search history.

(56) References Cited
U.S. PATENT DOCUMENTS

| | | | |
|---|---|---|---|
| 4,180,946 A | 1/1980 | Heijkenskjold et al. | |
| 5,084,644 A | 1/1992 | Harris et al. | |
| 5,153,475 A | 10/1992 | McSparran | |
| 5,543,673 A * | 8/1996 | Katsumata et al. | 310/90.5 |
| 2001/0013733 A1* | 8/2001 | Schob | 310/90.5 |

FOREIGN PATENT DOCUMENTS

| | | |
|---|---|---|
| DE | 824 231 | 12/1951 |
| DE | 23 55 104 | 5/1975 |
| EP | 1 223 357 | 7/2002 |
| WO | WO 97/02641 | 1/1997 |

* cited by examiner

*Primary Examiner*—Quyen Leung
*Assistant Examiner*—David W. Scheurmann
(74) *Attorney, Agent, or Firm*—Weingarten, Schurgin, Gagnebin & Lebovici LLP

(57) ABSTRACT

The device for magnetically suspending a rotor relative to a structure comprises at least one axial active magnetic bearing with a main electromagnet coil disposed in a stator and having load-bearing surfaces placed facing an armature extending essentially perpendicularly to the axis of the rotor. A device for detecting the axial position of the rotor is associated with circuits for servo-controlling the current carried by the main electromagnet coil. A compensation coil is disposed close to the main electromagnet coil, but in a position that is situated away from the load-bearing surfaces of the stator that co-operate with the rotor armature. The compensation coil is connected in series with the main electromagnet coil, but carries current in the opposite direction to that carried by said main electromagnet coil. The device constitutes an axial abutment of optimized capacity without magnetic leakage.

10 Claims, 4 Drawing Sheets

DEVICE FOR MAGNETICALLY SUSPENDING A ROTOR

This application claims priority to French application No. 06 50121 filed Jan. 13, 2006.

The present invention relates to a device for magnetically suspending a rotor relative to a structure, the device comprising at least one axial active magnetic bearing with a main electromagnet coil disposed in a first stator secured to the structure and having load-bearing surfaces placed facing a first rotor armature extending substantially perpendicularly to the axis of the rotor and presenting a free peripheral end, a device for detecting the axial position of the rotor, and circuits for servo-controlling the current flowing in the main electromagnet coil.

BACKGROUND OF THE INVENTION

A device of this type is already known, e.g. as shown in FIG. 7, that comprises an axial bearing 120 comprising a stator 122 of ferromagnetic material presenting an annular housing concentric with the axis of the rotor 10 for receiving a coil 123. The active surfaces 125, 126 of the stator 122 situated on either side of the housing in which the coil 123 is placed co-operate with a disk-shaped armature 11 that is secured to the rotor 10 and that is essentially perpendicular to the axis of the rotor 10. A sensor 35, which may be of the inductive, optical, or capacitive type, is also associated with the axial bearing 120 to detect the position of the rotor armature 11 relative to the stator 122 and deliver a signal to servo-control circuits (not shown) that power the coil 123 in order to create a magnetic field such that the active surfaces 125, 126 of the stator 122 can exert a force of attraction on the armature 11 so as to maintain it in an axial position that is stable. An axial bearing of the same type may also be disposed symmetrically relative to the armature 11 so as to exert a force of attraction on the second plane face of the armature 11 that is perpendicular to the axis of the rotor 10.

The structure 20 on which the stator 122 is mounted may also serve as a support for a radial magnetic bearing 30 disposed close to the axial bearing 120.

The radial active magnetic bearing 30 may comprise a stator 31 of laminated ferromagnetic material which is mounted on the structure 20 and includes electromagnetic windings 32 connected by connection wires 33 to power-supply and servo-control circuits (not shown). The radial magnetic bearing 30 further comprises an annular armature 34 likewise made of laminated magnetic material that is fitted on the rotor 10 and is thus concentric with the rotor 10. A detector 35 detects the radial position of the rotor 10 and may be placed on a support secured to the structure 20 in the vicinity of the radial bearing 30 in order to detect the radial position of the reference surface 36 at the periphery of the rotor 10 that faces the detector 35. The signals from the detector 35, which may be of the inductive, capacitive, or optical type, are applied to circuits for servo-controlling the current supplied to the electromagnet windings 32. In the example of FIG. 7, the detector 35, which is of the inductive type, serves to detect the position of the rotor 10 both in an axial direction and in two mutually perpendicular radial directions. The reference magnetic surface 36 is sandwiched in the axial direction between two surfaces of non-magnetic material.

In the device of FIG. 7, which uses only one coil 123 within the axial magnetic bearing 120, for a rotor armature 11 of given outside diameter, a maximum load-bearing surface area is obtained between the active surfaces 125 and 126 situated on either side of the housing for the coil 123 and the plane face of the rotor armature 11 which is situated facing these active faces.

However, the coil 123 creates circuits 101, 102 of non-zero magnetic flux circulation through the stators of the radial magnetic bearing 30 and of the position detector 35, through the rotor armatures 34, 36, 11, and through the shaft 10.

More particularly, the circuit 101 leads to the radial bearing 30 being magnetized, thereby leading to a loss in its capacity and creating coupling between the radial force and the axial force.

The circuit 102 leads to magnetization of the position sensors, leading to a loss of sensitivity thereof and creating coupling between measurements and the axial force.

The device shown in FIG. 7 thus presents the major drawback of creating significant amounts of magnetic leakage.

In order to remedy that problem and avoid magnetizing the surroundings of the magnetic abutment constituting the axial bearing, the solution shown in FIG. 8 has been proposed, in which figure those elements of the rotor 10, of the structure 20, and of the radial magnetic bearing 30 that are unchanged carry the same references and are not described again.

In the solution proposed with the device of FIG. 8, the axial magnetic bearing 220 has a stator 222 with two annular housings concentric with the axis of the rotor 10 for receiving coils 223 and 228.

By using an even number of coils 223, 228 and by causing current to flow in the coil 228 in the opposite direction to the current flowing in the coil 223, it is possible to ensure that each closed outline 201, 202 surrounding the coils 223, 228 perceives magnetic excitation that is zero.

The solution shown in FIG. 8 thus makes it possible to avoid the surroundings of the axial bearing 220 being magnetized by the magnetic excitation created by the coils of said axial bearing. This avoids magnetization interfering with the radial bearing 30, with the position sensor 35, or with the entire surroundings of the axial bearing.

Nevertheless, the fact of using two coils 223, 228 situated in two open housings reduces the active surface areas 225, 226, 227 that co-operate with the armature 11, thereby leading to a loss of load-carrying area for a disk-shaped armature 11 of given diameter. Unfortunately, in various applications, given the high speed of rotation of the rotor, it is not possible to increase the diameter of the rotor armature in the axial bearing beyond certain limits, so that implementing multiple coils within an axial bearing becomes problematic because of the residual active surface areas no longer being large enough, thereby limiting the capacity of the axial bearing.

OBJECTS AND SUMMARY OF THE INVENTION

The present invention seeks to remedy the above-mentioned drawbacks and to provide a magnetic abutment of diameter that is minimized for given capacity, while avoiding creating magnetic leakage looped in the machine and presenting a risk of leading to side effects harming proper operation of other devices situated in the vicinity of an axial magnetic bearing of a device for magnetically suspending a rotor.

In accordance with the invention, these objects are achieved by a device for magnetically suspending a rotor relative to a structure, the device comprising at least one axial active magnetic bearing with a main electromagnet coil disposed in a first stator secured to the structure and having load-bearing surfaces placed facing a first rotor armature extending substantially perpendicularly to the axis of the rotor and presenting a free peripheral end, a device for detecting the axial position of the rotor, and circuits for servo-controlling the current flowing in the main electromagnet coil, the device further comprising a compensation coil that is disposed close to the main electromagnet coil, but in a position that is situated away from the load-bearing surfaces of the first stator that co-operate with the first rotor armature, the compensation coil being connected in series with the main electromagnet coil and carrying current in a direction opposite to that carried by said main electromagnet coil.

In a first particular embodiment, the compensation coil is disposed on the peripherally outer wall of the first stator and is situated beyond the free peripheral end of the first rotor armature.

In another particular embodiment, the compensation coil is disposed on the inner peripheral wall of the first stator and is situated facing the base of the first rotor armature that is connected to the rotor.

In yet another particular embodiment, the compensation coil is disposed on a substantially radial wall of the first stator on its side opposite from the first rotor armature.

The compensation coil and the main coil of the axial active magnetic bearing are concentric.

Advantageously, the device of the invention further includes at least one radial active magnetic bearing disposed in the vicinity of the axial active magnetic bearing, the radial active magnetic bearing comprising a second stator secured to the structure and provided with electromagnet windings, and a cylindrical second rotor armature of axis coinciding with the axis of the rotor, a device for detecting the radial position of the rotor, and circuits for servo-controlling the current carried by said electromagnet windings of said second stator.

More particularly, in an aspect of the invention, the device for detecting the radial position of the rotor includes at least one sensor interposed between the second stator and the first stator.

The device may further include an electric motor for driving the rotor in the vicinity of the axial active magnetic bearing.

In general, the device of the invention makes it possible to provide a magnetic suspension that includes an axial magnetic abutment having large capacity and without magnetic leakage.

BRIEF DESCRIPTION OF THE DRAWINGS

Other characteristics and advantages of the invention appear from the following description of particular embodiments, given with reference to the accompanying drawings, in which.

MORE DETAILED DESCRIPTION

Figure 1:
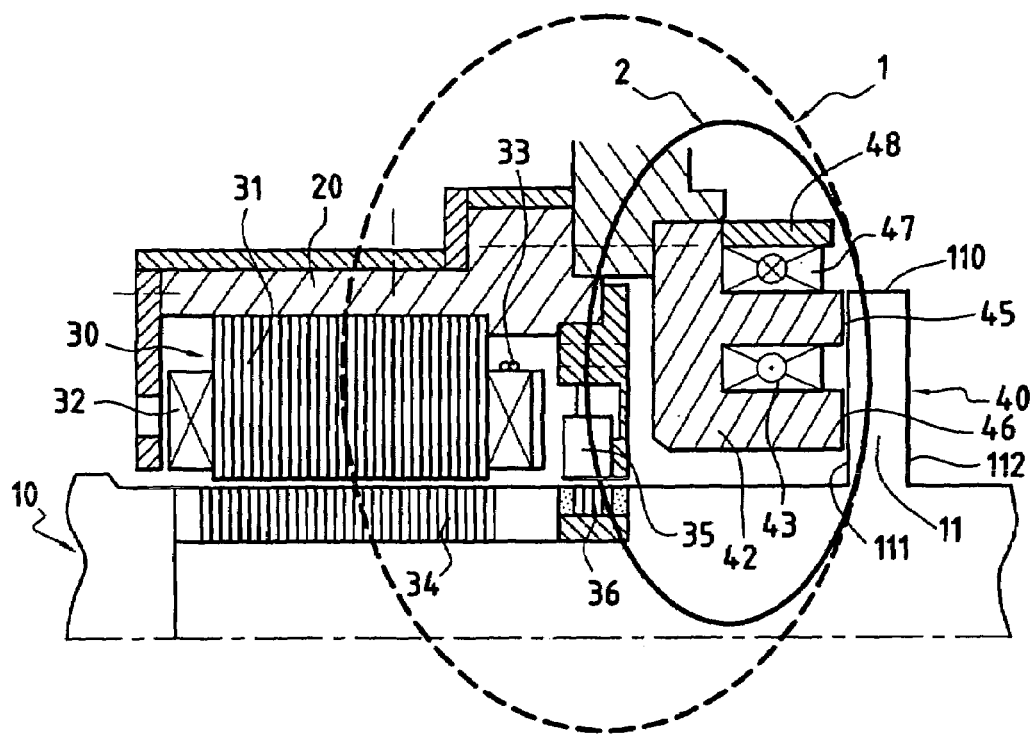
FIG. 1 is an axial section view of an embodiment of a magnetic suspension device of the invention.

FIG. 1 shows an embodiment of a device for magnetically suspending a rotor 10, the device essentially comprising an axial active magnetic bearing 40 and a radial active magnetic bearing 30 that enable the rotor 10 to be supported without contact relative to a stationary structure 20.

FIG. 1 shows only one radial magnetic bearing 30 disposed in the vicinity of the axial magnetic bearing 40. Nevertheless, a second radial bearing 70, that may optionally be of the same type as the radial bearing 30, is normally implemented in the vicinity of another portion of the rotor 10 at a certain distance from the radial bearing 30 in order to ensure that the rotor is held completely in the radial direction (see FIGS. 3 and 4).

Figure 3:
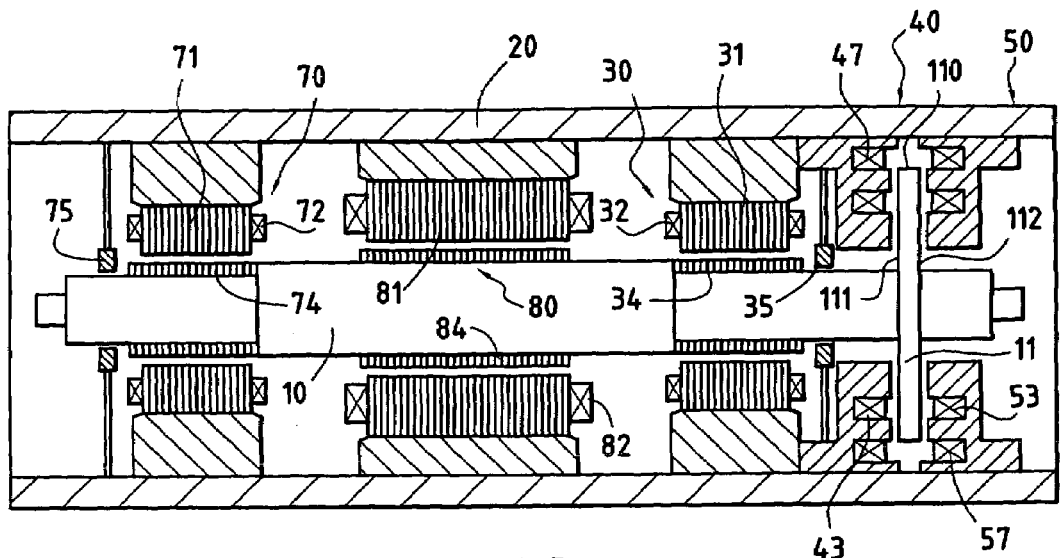
FIGS. 3 and 4 are diagrammatic views showing two possible embodiments of the magnetic suspension device of the invention.

A second axial magnetic bearing analogous to axial bearing 40 may also be installed in the vicinity of the axial bearing 40 symmetrically relative to the rotor armature 11 that is constituted in the form of a disk perpendicular to the axis of the rotor 10. Under such circumstances, the first axial bearing 40 co-operates with a first front face 111 of the rotor armature 11 while the second axial bearing 50 co-operates with a second front face 112 of the rotor armature 11 (FIG. 3).

Figure 4:
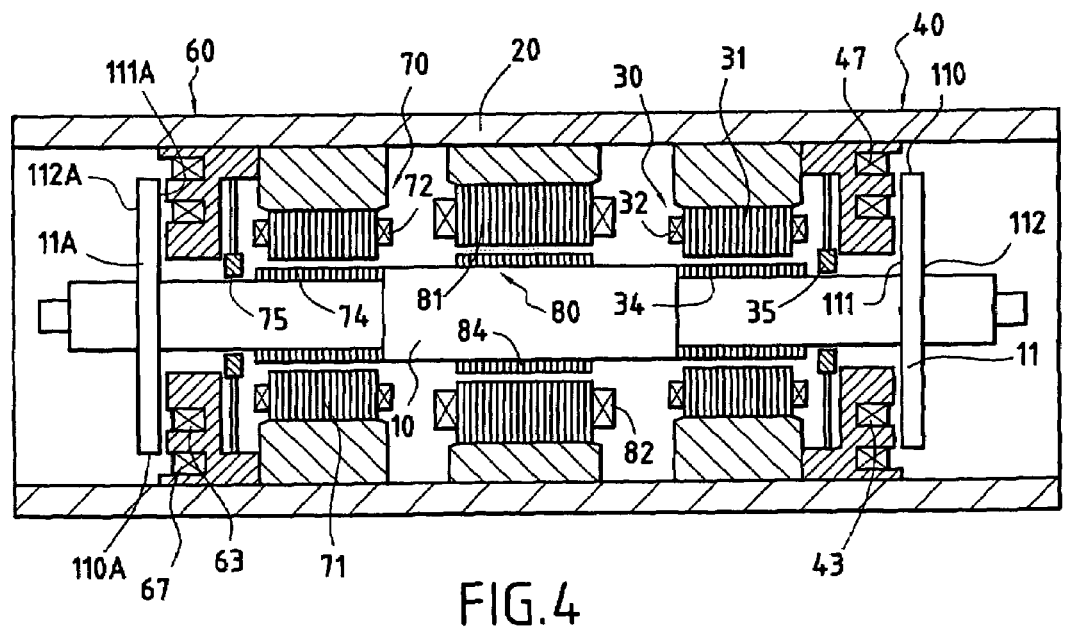

In another possible embodiment, a complete magnetic suspension comprises, in the vicinity of each of the ends of the rotor 10, an analogous assembly made up of a respective radial bearing 30 or 70 and a respective axial bearing 40 or 60, the disposition simply being symmetrical about the midpoint of the rotor 10, i.e. a first bearing assembly comprises an axial bearing 40 co-operating with a front face 111 of a first stator armature 11, the axial bearing 40 being situated in the vicinity of the first radial bearing 30, while a second bearing assembly comprises an axial bearing 60 co-operating with a front face 111A of a second rotor armature 11A, the axial bearing 60 being situated in the vicinity of the second radial bearing 70 between said bearing and the second rotor armature 11A (FIG. 4). In the embodiment of FIG. 4, the outside front faces 112, 112A of the rotor armatures 11, 11A are not used, however the action of the axial bearings 40, 60 exerted on the faces 111, 111A of the rotor armatures 11, 11A makes it possible to exert opposing forces in both directions along the axis of the rotor, in a manner like that in which two axial bearings 40, 50 co-operate with the two opposite front faces 111, 112 of a single rotor armature 11 (FIG. 3).

With reference again to FIG. 1, there can be seen a bearing assembly constituting a preferred embodiment of the invention.

The axial active bearing 40 comprises a main electromagnet coil 43 placed in a stator 42 of ferromagnetic material secured to the structure 20. The stator 42 defines active surfaces or load-carrying surfaces 45, 46 that are situated on either side of the housing for the main coil 43 and placed facing the front face 111 of the rotor armature 11 at a small distance therefrom, defining an airgap. The rotor armature 11 secured to the rotor 10 is essentially perpendicular to the axis of the rotor 10 and presents a free peripheral end 110 remote from its zone connected to the rotor 10.

A compensation coil 47 is disposed on the stator 42 in such a manner as to be concentric with the main coil 43, and fairly close to said main coil 43, while nevertheless being situated in a position that is to be found in the radial direction away from the free peripheral end 110 of the rotor armature 11.

The compensation coil 47 is connected in series with the main coil 43, but it is wound or connected in the opposite direction to the main coil 43 so as to carry current in the direction opposite to the current carried by the main coil 43. This serves to cancel the magnetic excitation on any path outside the axial magnetic bearing 40 and thus to avoid creating interfering magnetization in surrounding parts.

By way of example, FIG. 1 shows the current traveling in the main coil 43 as a vector whose tip is coming out of the plane of the figure while the current carried by the compensation coil 47 is represented by a vector whose tip is going into the plane of the figure. The closed circuits 1 and 2 of FIG. 1 represent paths outside the axial abutment 40 in which magnetic flux circulation is zero.

As a result, although the active surfaces 45, 46 of the stator 42 situated facing the rotor armature 11 remain maximized in area for a given radial size of the radial armature 11, there is no parasitic magnetization of the radial magnetic bearing 30 or of the position detector 35 that are located close to the axial bearing 40.

A protective plate 48 may be fitted on the stator 42 outside the compensation coil 47 in order to protect it.

Figure 7:
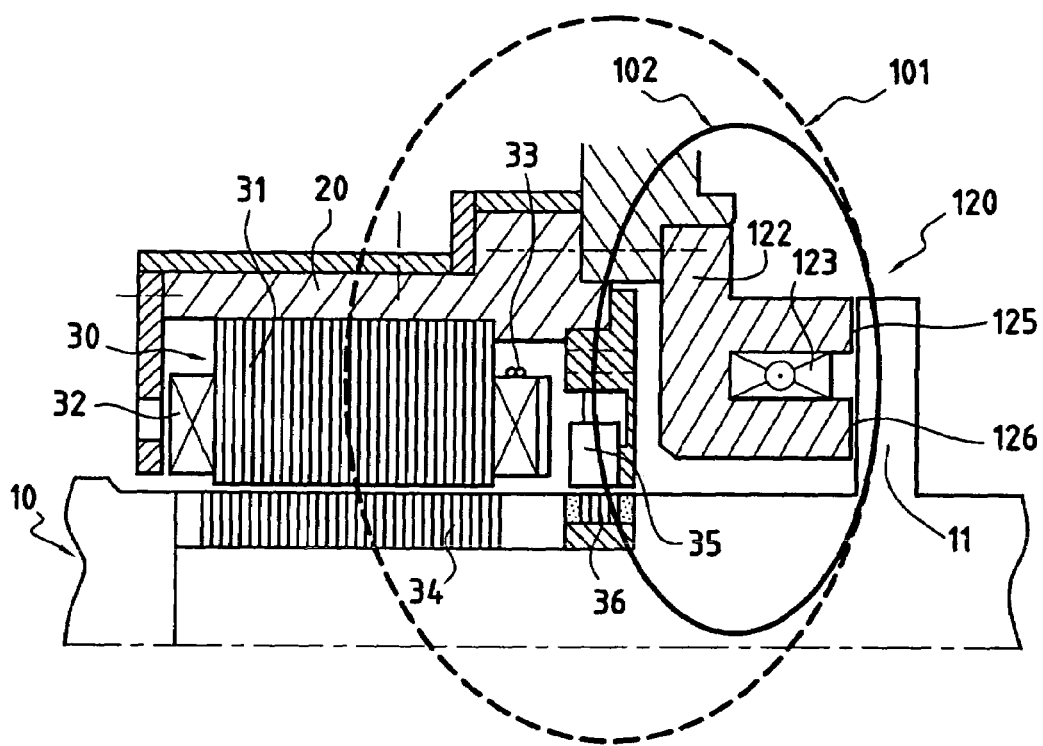
FIG. 7 is an axial section view of a first example of a prior art magnetic suspension device.
Figure 8:
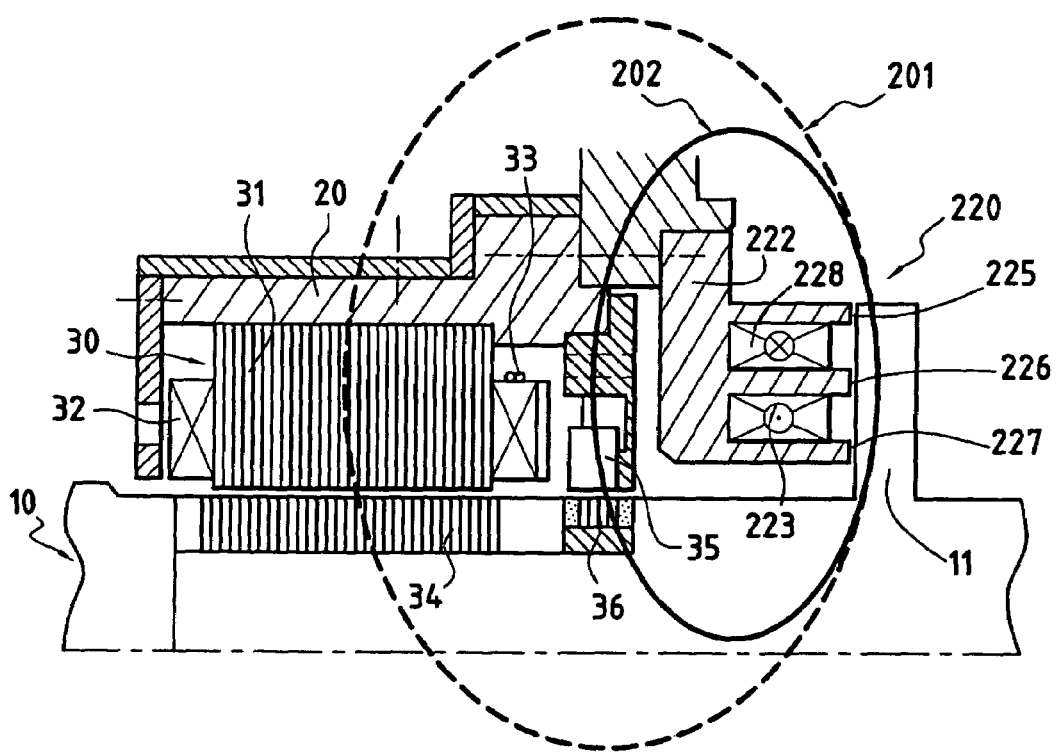
FIG. 8 is an axial section view of a second example of a prior art magnetic suspension device.

The radial magnetic bearing 30 and the position detector 35 may conserve the same structure as that described above with reference to FIGS. 7 and 8, such that this structure is not described again. In particular, the position detector 35 can detect both the axial position of the rotor and the radial positions of the rotor along two mutually perpendicular axes. Nevertheless, it would also be possible to use radial detectors and an axial detector that are distinct.

The radial magnetic bearing 70 of FIGS. 3 and 4 may itself optionally be similar to the radial magnetic bearing 30. In the examples shown in FIGS. 3 and 4, the cylindrical rotor armature 74, the stator 71, and the windings 72 are similar to the corresponding elements 34, 31, and 32 of the radial magnetic bearing 30, and the position detector 75 may likewise be similar to the detector 35 for radial detection purposes.

Figure 2:
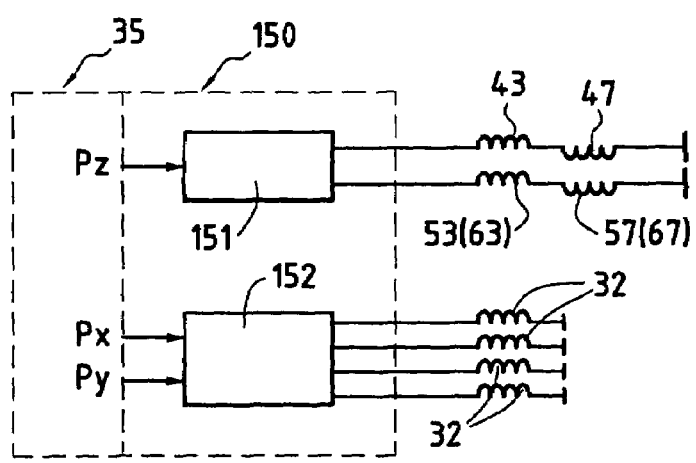
FIG. 2 is a schematic showing the electrical power supply circuits for the coils of the FIG. 1 device.

FIG. 2 is a schematic showing the circuits 50 for powering and servo-controlling the coils of the various bearings, while taking account of the position signals Px, Py, Pz delivered by the position detector 35.

The main coil 43 and the compensation coil 47 of the axial bearing 40 that are connected in series are powered from servo-control circuits 151 having the signal Pz from the position detector 35 applied thereto, that gives information about the axial position of the rotor 10.

Similarly, the windings 32 of the radial bearing 30 are powered from servo-control circuits 152 having the signals Px, Py from the position detector 35 applied thereto that provide information about the radial position of the rotor 10. Naturally, the signals coming from additional detectors could also be applied to the circuits 151 or 152 in various known configurations.

In the examples of FIGS. 3 and 4, the axial bearings 50 and 60 can be made in a manner similar to the axial bearing 40 and they can thus comprise a respective main coil 53, 63 together with a respective compensation coil 57, 67, e.g. situated radially beyond the respective peripheral wall 110, 110A of the respective rotor armature 11, 11A, the axial position servo-control being provided using the position detector 35. The coils 53 and 57 or 63 and 67 can be powered like the coils 43 and 47 from the servo-control circuits 151.

As can be seen in FIGS. 3 and 4, an electric motor 80 having a rotor armature 84 and a laminated stator 81 provided with windings 82 may be disposed on the rotor 10, e.g. between the radial bearings 30 and 70. The fact that the axial magnetic suspension device of the invention does not have any magnetic leakage reduces the risk of the operation of the motor 80 being disturbed, as well as any risk of disturbing the operation of the radial bearings 30, 70 or of the detectors 35, 75.

The embodiment of FIG. 1 constitutes a preferred embodiment. Nevertheless, other variant embodiments are possible, such as those shown in FIGS. 5 and 6.

The compensation coil can be placed close to the main coil 33 away from the load-bearing surfaces of the magnetic structure co-operating with the first rotor armature, in positions that are different from that shown in FIG. 1.

Figure 5:
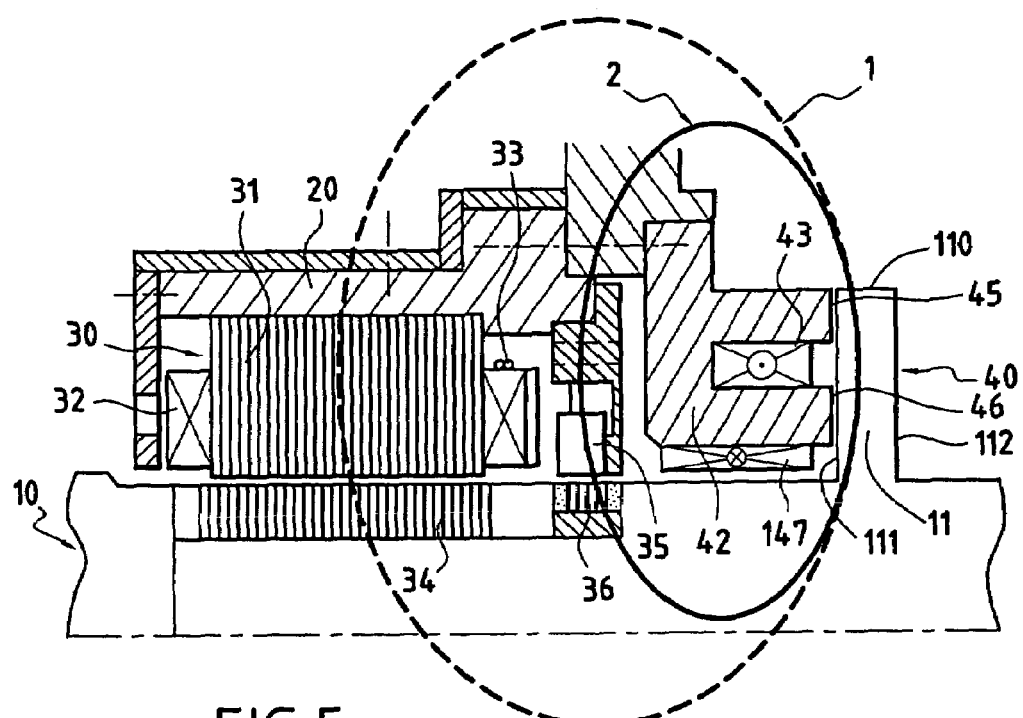
FIGS. 5 and 6 are views analogous to FIG. 1 showing variant embodiments of the magnetic suspension device of the invention.

In FIG. 5, there can be seen a compensation coil 147 which is disposed on an inside peripheral wall of the first stator 42 outside the load-bearing surfaces 45, 46. The compensation coil 147 is situated facing the base of the rotor armature 11 in the vicinity of the peripheral surface of the rotor 10 in the smallest-diameter zone of the armature 11, i.e. the zone with reduced load-carrying capacity.

Figure 6:
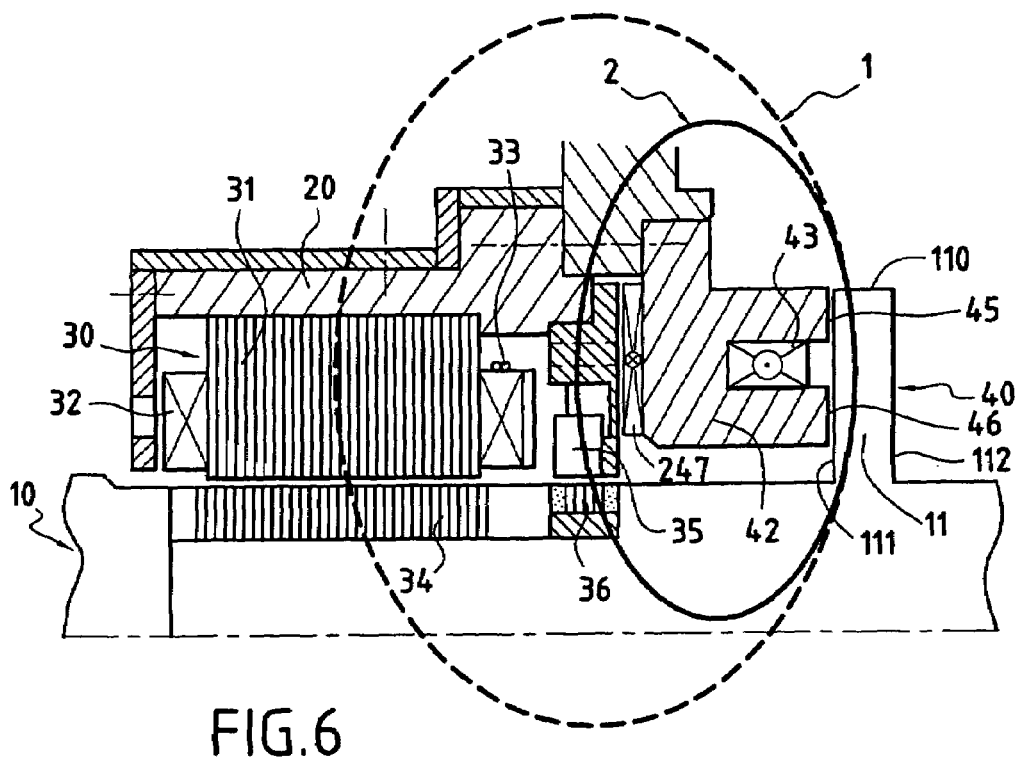

FIG. 6 shows another variant embodiment in which the compensation coil 247 is disposed on an essentially radial wall of the stator 42 on its side opposite from the load-bearing surfaces 45, 46 that face the rotor armature 11.

Providing it defines an equivalent number of ampere-turns, the compensation coil 147 or 247 does not necessarily have the same shape as the main coil 43 and, for example, it may be flatter.

In the variant of FIGS. 5 and 6, the compensation coil 147 or 247 is still connected in series with the main coil 43, but is wound or connected in the opposite direction to the main coil 43, like the coils 47 and 43 in FIGS. 1 and 2, such that the sum of the ampere-turns of the coils 43 and 147 or 43 and 247 is substantially zero.

Naturally, various modifications and additions could be applied to the embodiments described above.

Thus, the invention also applies when an active magnetic bearing is of the position self-detection type without a separate position detector being associated therewith.

What is claimed is:

1. A device for magnetically suspending a rotor relative to a structure, the device comprising at least one axial active magnetic bearing with a main electromagnet coil disposed in a first stator secured to the structure and having load-bearing surfaces placed facing a first rotor armature extending substantially perpendicularly to the axis of the rotor and presenting a free peripheral end, a device for detecting the axial position of the rotor, and circuits for servo-controlling the current flowing in the main electromagnet coil, the device further comprising a compensation coil that is disposed close to the main electromagnet coil, but in a position that is situated away from the load-bearing surfaces of the first stator that co-operate with the first rotor armature, the compensation coil being connected in series with the main electromagnet coil and carrying current in a direction opposite to that carried by said main electromagnet coil.

2. A device according to claim 1, further including at least one radial active magnetic bearing disposed in the vicinity of the axial active magnetic bearing, the radial active magnetic bearing comprising a second stator secured to the structure and provided with electromagnet windings, and a cylindrical second rotor armature of axis coinciding with the axis of the rotor, a device for detecting the radial position of the rotor, and circuits for servo-controlling the current carried by said electromagnet windings of said second stator.

3. A device according to claim 2, wherein the device for detecting the radial position of the rotor includes at least one sensor interposed between the second stator and the first stator.

4. A device according to claim 3, wherein the device for detecting the axial position of the rotor is combined with the device for detecting the radial position of the rotor.

5. A device according to claim 1, wherein the compensation coil is disposed on the peripherally outer wall of the first stator and is situated beyond the free peripheral end of the first rotor armature.

6. A device according to claim 1, wherein the compensation coil is disposed on the inner peripheral wall of the first stator and is situated facing the base of the first rotor armature that is connected to the rotor.

7. A device according to claim 1, wherein the compensation coil is disposed on a substantially radial wall of the first stator on its side opposite from the first rotor armature.

8. A device according to claim 5, wherein an outer protective plate of the compensation coil is fitted on the first stator.

9. A device according to claim 1, wherein the compensation coil and the main coil of the axial active magnetic bearing are concentric.

10. A device according to claim 1, further including an electric motor for driving the rotor in the vicinity of the axial active magnetic bearing.

* * * * *